United States Patent

Hatano et al.

[15] 3,641,330

[45] Feb. 8, 1972

[54] MICROPROGRAMMED DIGITAL COMPUTER PROVIDING VARIOUS OPERATIONS BY WORD CIRCULATION

[72] Inventors: Isao Hatano; Kenichi Kitajima; Katsumi Iwatani, all of Kyoto, Japan

[73] Assignee: Omron Tateisi Electronics Co., Kyo-Ku, Kysto, Japan

[22] Filed: May 7, 1969

[21] Appl. No.: 822,394

[30] Foreign Application Priority Data

May 14, 1968 Japan....................................43/32341

[52] U.S. Cl................................235/159, 235/176, 340/324

[51] Int. Cl..............................................................G06f 7/48

[58] Field of Search..................235/159, 160, 164, 165, 156, 235/168, 176; 340/172.5, 324

[56] References Cited

UNITED STATES PATENTS

| | | | |
|---|---|---|---|
| 2,991,456 | 7/1961 | Evans | 340/172.5 X |
| 3,059,851 | 10/1962 | Robinson | 235/165 |
| 3,156,815 | 11/1964 | Smeltzer | 235/168 X |
| 3,249,745 | 5/1966 | Burkhart | 235/160 |
| 3,253,266 | 5/1966 | Samwel | 340/172.5 |
| 3,350,692 | 10/1967 | Cagle et al. | 235/159 |
| 3,428,793 | 2/1969 | Scuitto | 235/160 |
| 3,526,760 | 9/1970 | Ragen | 235/158 |

*Primary Examiner*—Eugene G. Botz
*Assistant Examiner*—David H. Malzahn
*Attorney*—Christensen & Sanborn

[57] ABSTRACT

A plurality of shift registers are interconnected serially by a plurality of gates. To perform computer micro-operations, the words contained within the registers are circulated therethrough in steps, each step being divided into a plurality of separate time periods. The particular operation that is being performed is controlled by microprogrammed matrices which provide appropriate control signals during each time period to determine which gates are to be opened therein. Specific configurations are described for the operations of word addition, word transfer between registers, word transfer back to a register, shifting out of a register the greatest or the least significant digit of a word, and so forth. In addition, a configuration is shown including a single register and a decoding matrix for serially transferring the word in one register to a numeric display device, as is a configuration allowing retention of other words in the remaining registers during such a transfer. Finally, various embodiments of the microprogrammed matrices are shown.

9 Claims, 8 Drawing Figures

FIG. 1.
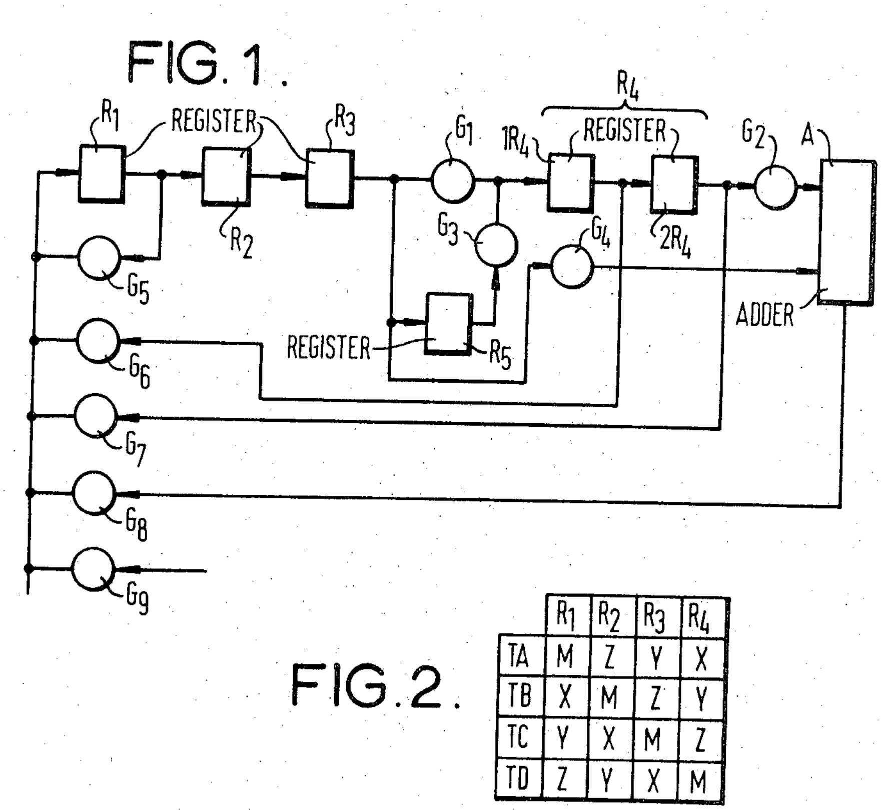
FIG. 2.
| | R1 | R2 | R3 | R4 |
|---|---|---|---|---|
| TA | M | Z | Y | X |
| TB | X | M | Z | Y |
| TC | Y | X | M | Z |
| TD | Z | Y | X | M |
FIG. 3.
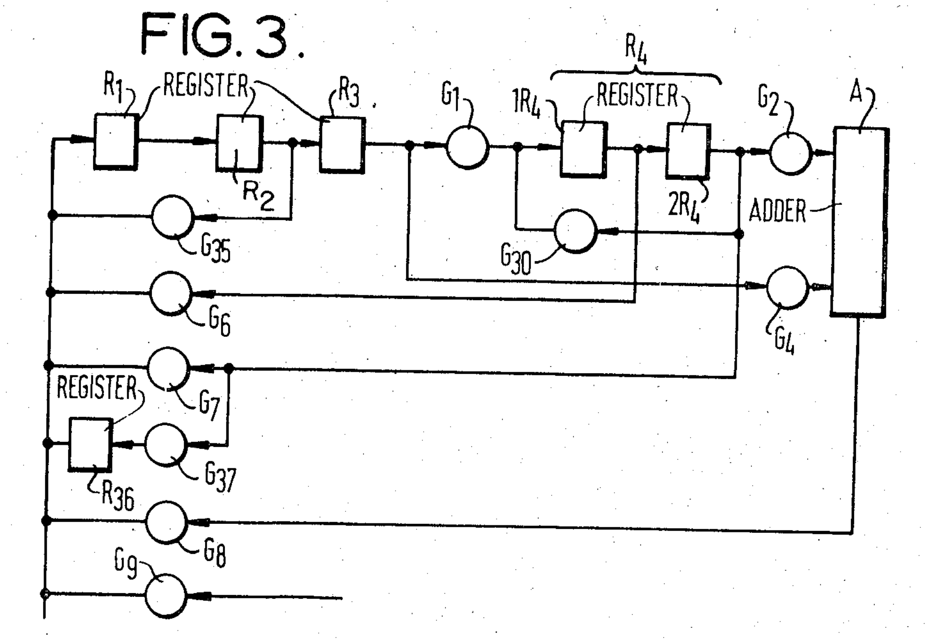
INVENTORS
ISAO HATANO
KENICHI KITAJIMA
KATSUMI IWATANI
BY Christensen, Sanborn & Matthews
ATTORNEYS INVENTORS
ISAO HATANO
KENICHI KITAJIMA
KATSUMI IWATANI
BY Christensen, Sanborn & Matthews
ATTORNEYS INVENTORS
ISAO HATANO
KENICHI KITAJIMA
BY KATSUMI IWATANI
Christensen, Sanborn & Matthews
ATTORNEYS INVENTORS
ISAO HATANO
KENICHI KITAJIMA
KATSUMI IWATANI
BY Christensen, Sanborn & Matthews
ATTORNEYS

MICROPROGRAMMED DIGITAL COMPUTER PROVIDING VARIOUS OPERATIONS BY WORD CIRCULATION

This invention relates to an electronic digital computer.

As is well known, electronic digital computers generally comprise a plurality of registers and an adder with a plurality of gates connected therebetween, the registers are connected in parallel with each other so that transfers word or other operations are performed in parallel. In such prior art arrangements, however, each register must be provided with one gate for each operation to be performed, so that there must be many gates, with resulting complication of the whole computer system.

Accordingly, the primary object of the invention is to provide a digital electronic computer which employ fewer gates than are required in conventional computers of similar types.

Another object of the invention is to provide a digital electronic computer which comprises a plurality of shift registers connected in series with each other, with as many gates as are needed for circulation, shift, transfer, and addition.

Another object of the invention is to provide such a digital electronic computer as aforesaid, wherein microprogramming is very much simplified.

Other objects of the invention, with its features and advantages, will become apparent from the following detailed description of some preferred embodiments thereof with reference to the accompanying drawings, wherein the same reference symbols denote corresponding parts and wherein:

FIG. 1 is a block diagram of one embodiment of the invention;

FIG. 2 is a time chart showing the operation of the shift registers employed in the system of the invention;

FIG. 3 is a diagram similar to FIG. 1 but showing another embodiment of the invention;

Figure 4:
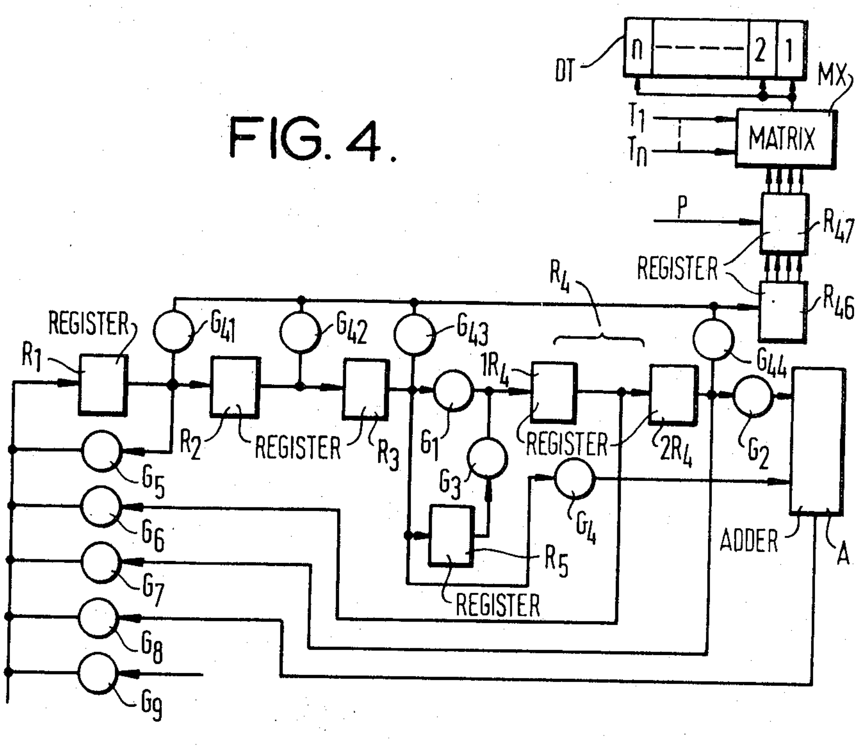
FIG. 4 is a diagram similar to FIG. 1, with a device for indicating the results of the operation performed.

Referring now in detail to the drawings, first to FIG. 1, the symbol R with a numeral subscript denotes a shift register and the symbol G with a numeral subscript denotes a gate. To perform the operation of circulation, the registers R1, R2, R3, the gate G1, the register R4, the gate G7 and back to the register R1 form a circulating system. Suppose that at time TA (see FIG. 2) the registers R1–R4 store the numbers or values M, Z, Y and X, respectively. Under this condition, if the gates G1 and G7 are opened, the contents in the registers R1–R4 will circulate therethrough during times TB, TC and TD, as shown in FIG. 2. The initial storing of the values M, X, Z and Y in the registers R1–R4 is effected by opening the gate G9 as the values are coming to the gate through an input line.

To perform the operation of addition, there is provided an adder A to which the registers R3 and R4 are connected through the gates G4 and G2, respectively. Therefore, with gates G4 and G2 open, the contents in the registers R3 and R4 enter the adder therethrough. If the gates G2 and G4 are opened at time TA, the result of the addition by the adder will be Y+ X. This output from the adder is transferred through the gate G8 back to the register R1 to be stored therein. Such adding operation makes it possible to perform any desired calculations by the use of the operation of transfer and/or shift to be described below.

Transfer of the information stored in one of the registers to another is effected in the following manner. Suppose, for example, that at time TA the registers R–R4 store the values M, Z, Y and X, respectively. If it is required at the next time TB to transfer the value Y in the register R3 into not the register R4, but back to the register R1, the gates G4 and G8 alone are opened. Then, at time TB the value X stored in the register R4 remains there, and the value Y in the register R3 is transferred through the gate G4, the adder and the gate G8 to the register R1.

It may sometimes be desired to effect transfer in the opposite direction, that is, the transfer by which the value, say, M in the register R1 is transferred to the register R2 and at the same time the contents of the register R1 remain M yet. To enable this, a gate G5 is provided across the register R1. With this gate G5 being opened, the value M stored in the register R1 at time TA is transferred at the next time TB into the next register R2 and at the same time back to the register R1 through the then open gate G5.

In accordance with the invention, shifting is performed in the following manner. Let the register R4 have stared therein a value which is to be shifted. The register R4 is divided into two registers 1R4 and 2R4. The register 2R4 has the capacity to store four bits corresponding to one decimal digit and is combined with the register 1R4 to form the register R4 having the same storing capacity as the other registers R1–R3. The register 1R4 is connected to the register R1 through a gate G6. If the gate G6 only is opened, the one digit stored in the register 2R4 is not transferred to the register R1, but the other digit or digits stored in the register 1R4 are transferred to the register R1. This means that the value stored in the register R4 has been shifted one digit to the right and transferred to the register R1.

Shifting in the opposite direction is effected in the following manner. Let the register R3 be taken for example, whose contents are to be shifted in the opposite direction. Between the registers R3 and R4 there are connected a register R5 and a gate G3 in series. Just like the register 2R4, the register R5 has a capacity to store four bits corresponding to one decimal digit. With the gate G3 alone being open, when the next time starts, the value stored in the register R3 is transferred through the register R5 and the gate G3 to the register R4. However, just when the register R5 has registered the four bits of the most significant digit of the value being transferred, the time provided for that transfer has expired, so that the four bits remain in the register R5 and will not be transferred to the register R4. This means that the value transferred from the register R3 to the register R4 has been shifted one digit in the opposite direction, that is, to the left.

So far the operation of the system has been explained with reference to addition. Subtraction can be performed by adding the complement of a number to subtract; multiplication, by repeated addition; and division, by repeated subtraction. Thus, subtraction, multiplication and division can be performed through utilization of the previously mentioned operation of addition.

In the arrangement of FIG. 1, the gate G5 is provided for the purpose of transferring the contents of the register R1 back to itself. However, if it is desired to transfer the contents in any other register, say, the register R4 back to itself, a gate G30 may be connected across the register R4, as shown in FIG. 3. In FIG. 1, the memory stored in the register R1 is transferred back to the same register R1. However, if it is desired to transfer the contents in the register R2 back to the register R1, a gate G35 is connected across the registers R1 and R2 as shown in FIG. 3.

In FIG. 1, the register R5 and the gate G3 are added for shifting to the left. In FIG. 3, a register R36 of the same storing capacity as the register R5 and a gate G37 are connected in series between the registers R4 and R1 for a similar purpose. If the gate G37 is opened while the gate G7 is closed, the four bits corresponding to the most significant digit of the number stored in the register R4 is retained by the register R36 and is not transferred to the register R1, thereby effecting the shifting to the left of the contents in the register R4.

When the above-mentioned operations have been finished, the result must be indicated. To enable such indication, the outputs from the registers R1–R4 are applied to a register R46 through gates G41–G44, respectively, as shown in FIG. 4.

The register R46 is capable of storing four bits corresponding to one decimal digit, and the output lines of the register R46 corresponding to the four bits are connected to a register R47, so that upon application of every one pulse P to the register R47, the contents in the register R46 are transferred to the register R47. The pulses P are applied one pulse for each period of time required for the four bits to be transferred. Thus, the register R47 retains a digit until the four bits corresponding to the next digit are transferred to the register R46.

The outputs from the register R47 are applied to a matrix MX. Timing pulses T1–T*n* are also applied to the matrix MX. These timing pulses correspond to the digits, that is, one timing pulse for every four bits. Upon application of the pulses T1–T*n*, the matrix MX converts the information received from the register R47 to a corresponding decimal number, which is numerically indicated by a decimal indicator DT including a plurality of indicating tubes 1*n*, each capable of expressing the numerals 0 through 9. For example, the decimal number "567" is indicated in the following manner. While the register R47 stores a binary code corresponding to the decimal number "7," upon receipt of the first timing pulse T1 the matrix MX actuates the indicator tube 1 to express the numeral "7," This indication continues until the register R46 stores the code corresponding to the number "6" of the next digit. Upon application of the next pulse P to the register R47, the code corresponding to "6" is transferred to the register R47. At the same time, the next timing pulse T2 comes, whereupon the matrix produces an output, which energizes the indicator tube 2 to express the numeral "6" therein. In a similar manner, upon application of the third pulse T3, the matrix MX produces an output to cause the indicator tube 3 to express the numeral "5." Thus, the number "567" is indicated on the indicator DT.

Now will be the time to explain the manner in which the contents in the registers R1–R4 are transferred to the register R46 so as to be indicated. Suppose that it be the number X stored in the register R4 at time TA that is to be indicated. Of all the gates G41–G44, let the gate G44 alone be opened, and the contents in the registers R1–R4 be circulated by opening the gate G7 in the manner previously mentioned. When the time TA passes into time TB, the number X stored in the register R4 is transferred to the register R1. During the course of transfer the number X in the register R4 is transferred digit by digit to the register R46 through the open gate G44, and as mentioned just above, the number X is indicated on the indicator DT. During the time TB the gate G41 is open. At this time, the register R1 has the number X transferred from the register R4. Therefore, the number X in the register R1 is also transferred digit by digit to the register R46 so as to be indicated on the indicator DT. Thus, so long as that gate is opened which is connected to the register to which the number X has been transferred by circulation, the indicator DT always indicates the same number X.

Figure 5:
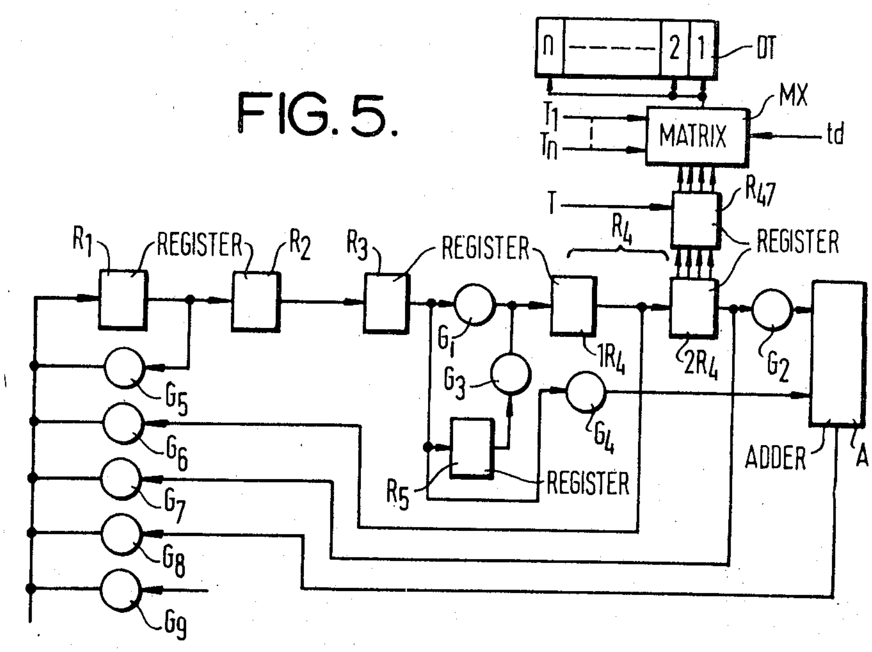
FIG. 5 is a diagram similar to FIG. 4, with a modified form of the indicating device.

For indication of the contents stored in a particular one of the registers R1–R4, the arrangement of FIG. 4 requires the additional gates G41–G44 which are controlled, as the contents of the registers are circulated, so as to take out the contents to be indicated through the gates. The same result can be obtained by a much simpler arrangement as shown in FIG. 5, wherein the gates G41–G44 and the register R46 are dispensed with. In FIG. 5, suppose that it be the number X that is to be indicated on the indicator DT. In this case, first the other numbers Y, Z and M must be replaced by the number X by means of transfer, with the gate G5 being open, in the manner previously mentioned, and after all the registers R1–R4 have thus stored the number X, this number X is taken out from the register 2R4 so as to be indicated on the indicator DT in the manner previously described.

It is sometimes desired to have on of the numbers, say, X indicated while at the same time retaining another of the numbers, say, M during the indication of the number X. In this case, the numbers Y and Z, which need neither be retained nor indicated, are replaced by the number X, with the number M being retained in the manner mentioned above, so that three of the registers R1–R4 simultaneously store the number X while the other register stores the number M. Thus, the number X and M alone circulate through the registers R1–R4. Therefore, when the number M enters the register R4, the operation of the matrix MX must be prevented by a signal *td* so as not to indicate the number M on the indicator DT until the number X from the register R3 replaces the number M which is then transferred to the register R1. It is seen that the arrangements of FIGS. 4 and 5 employ the method of time sharing display, so that the single register R47 and matrix MX suffice for all the indicator tubes 1*n*. This greatly simplifies the construction of the indicating device. Otherwise, the device would require as many matrices and registers, such as MX and R47, as there are indicator tubes.

From the above description, it is now clear that one step during which the stored numbers are circulated once through the registers R1–R4 comprises four periods of time TA–TD. During this one step, shift, addition, and transfer are performed and during several steps various operations are performed to obtain the desired result. To enable such operations, a microprogram is formulated to provide gate signals to control the opening and closing of the various gates.

Figure 6:
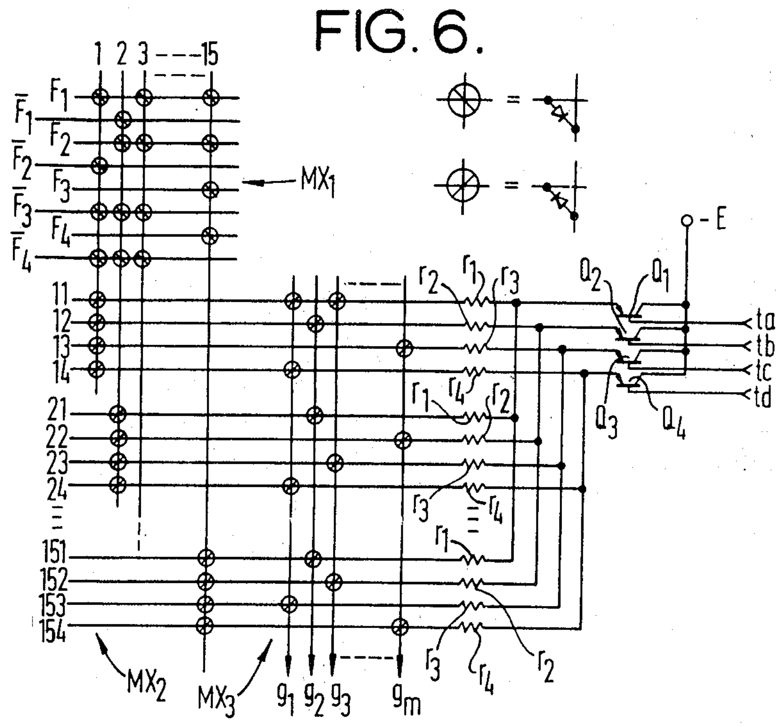
FIGS. 6–8 are different arrangements of the matrices used for microprogramming.

This invention has for one of its objects the simplification of such microprograms. The arrangement of FIG. 6 is directed toward accomplishing this object. As is usual with arrangements for microprogramming, a pulse counter is provided, though not shown, for counting clock pulses supplied from a suitable pulse generator, not shown. The pulse counter comprises four flip-flops. The set outputs F1, F2, F3 and F4 and the reset outputs $\overline{F1}$, $\overline{F2}$, $\overline{F3}$ and $\overline{F4}$ of the flip-flops are applied to one input of a diode matrix MX1, which generates signals defining 15 separate steps for operation by producing first through 15-step outputs on lines 1–15. These 15-step outputs are connected to 15 groups of four lines 11–14, 21–24, . . . and 151–154 in a matrix MX2.

Each of the lines 11, 21,...,151 is connected to a transistor Q1 through a resistor *n*L; each of the lines 12, 22, . . ., 152, . . ., 152, to a transistor Q2 through a resistor R2; each of the lines 13, 23, . . ., 153, to a transistor Q3 through a resistor R3; and each of the lines 14, 24, . . ., 154, to a transistor Q4 through a resistor R4. The transistors Q1–Q4 are successively rendered conductive by timing pulses *ta*, *tb*, *tc* and *td*, respectively, which are produced in synchronism with the previously mentioned times TA–TD, so as to connect the matrix MX2 to a negative voltage source –F. The negative potential thus appearing on the lines 11–14, 21–24, . . ., and 151–154 causes gate signals *gL*–*gm* to be produced by a third matrix MX3 to selectively open the gates.

The operation of the above arrangement is as follows: To take step 2, for example, the outputs $\overline{F1}$, $\overline{F2}$, $\overline{F3}$ and $\overline{F4}$ are applied to line 2 through the diodes in the matrix MX1. Line 2 is connected to the lines 21–24 through the diodes in the matrix MX2. At time TB in step 2, for example, the signal *tb* is applied to the transistor Q2 to render to the same conductive, so that the potential on the line 22 alone becomes negative. This causes the matrix MX3 to produce a signal on the line *gm*. At this time, on the other lines 11–24, 21, 23, 24, . . .,151–154 corresponding to the 14 other steps, there is no signal due to the absence of a step output signal applied thereto from the matrix MX1. Therefore, no other gate signals are produced on the other *gL* (*m–1*). The particular one of the lines 1gm on which the gate signal is produced and the time of signal production is determined by the arrangement of the matrices MX1–MX3.

With the arrangement of FIG. 6, one step comprises four times TA–TD, and at each of the times a gate signal may be produced, so that simplification of the microprogram is achieved. Since current flows through only those lines corresponding to one of the four times, power consumption can be reduced with resulting decrease in the amount of heat produced in the circuit.

Figure 7:
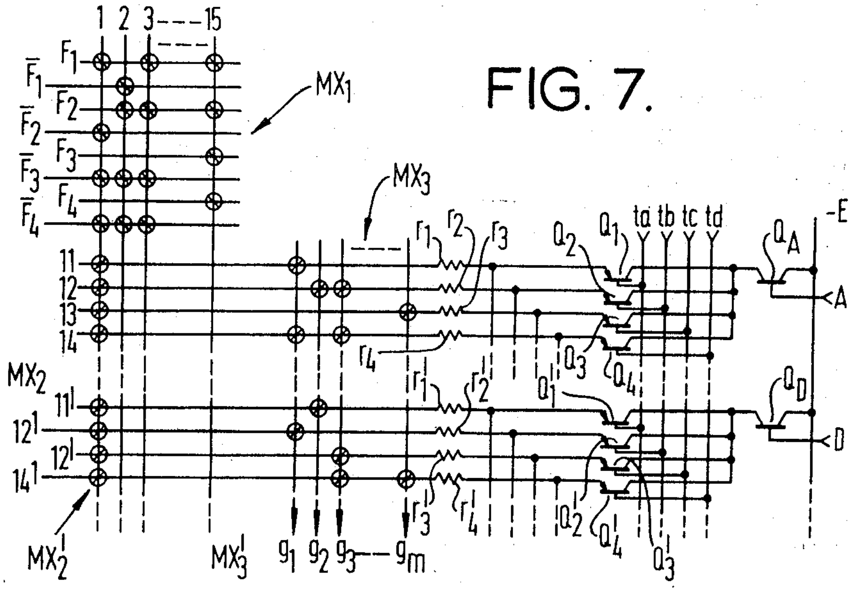

The circuit of FIG. 6 is designed for one operation. For a different operation the circuit of FIG. 7 is designed. In FIG. 7 the same reference numerals and symbols as in FIG. 6 denote corresponding parts. In FIG. 7, matrices MX'2 and MX'3 are additionally provided, corresponding to the matrices MX2 and MX3, respectively; transistors Q'1–Q'4 are additionally provided, corresponding to the transistors Q1–Q4; and lines 11'–14α⅔·21'–24',. . ., 151'–154' are additionally provided, corresponding to the lines 11–14, 21–24, . . ., 151–. . ., 154. The transistors Q1–Q4 are connected to a negative voltage source –E through a transistor QA which is rendered conductive when a signal A denoting an operation such as addition has been applied thereto; while the transistors Q'1–Q'4 are connected to the negative source –E through another transistor QD which is rendered conductive when a signal D denoting another operation such as subtraction has been applied thereto. It will be easily seen that the application of the signals A or D to the transistors QA or QD causes a gate signal to appear on one of the *gL* lines *g–m*.

Figure 8:
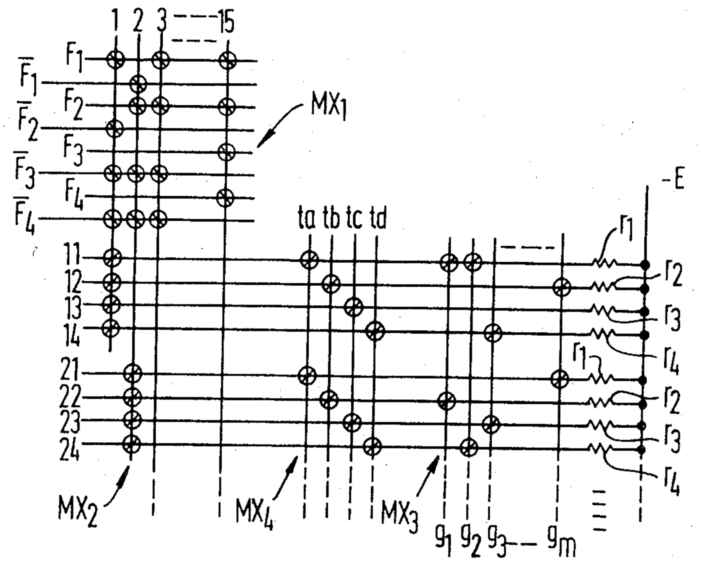

FIG. 8 shows an arrangement in which the transistors Q1–Q4 in FIG. 6 can be dispensed with. Here, too, the same reference numerals and symbols as in FIG. 6 or 7 denote corresponding parts. There is provided a diode matrix MX4, to which the timing pulses *ta–td* are applied. It will be seen that when the output from the matrix MX2 coincides with that of the matrix MX4, the matrix MX3 produces a gate signal on the *gL* lines *g–m*. It is seen that the arrangement of FIG. 8 helps achieve further simplification of the microprogram.

We claim:

1. An electronic electronic digital computer comprising:
a. first, second and third registers, each having an input and an output,
b. means connecting the output of said first register to the input of said second register,
c. a first gate for coupling the output of said first register to its input,
d. a second gate for coupling the output of said second register to the input of said third register,
e. a fourth register having a capacity equal to the number of bits corresponding to one decimal digit,
f. a third gate for coupling the output of said fourth register to the input of said third register, and means connecting the output of said second register to the input of said fourth register,
g. an adder having two inputs and an output,
h. fourth and fifth gates for coupling, respectively, the outputs of said second and third registers to the inputs of said adder,
i. a sixth gate for coupling the output of said adder to the input of said first register, and
j. a microprogrammed control unit for supplying appropriate control signals to said gates to effect the operations of circulation, shift and transfer.

2. A computer as recited in claim 1, wherein said third register comprises fifth and sixth registers, said fifth register having a capacity equal to the number of bits corresponding to the digits of a decimal number, minus one digit, and said sixth register having a capacity equal to the number of bits corresponding to one decimal digit, means connecting the input of said fifth register as the input of said third register, means connecting the output of said sixth register as the output of said third register, means connecting the output of said fifth register to the input of said sixth register, and seventh and eighth gates for coupling the outputs of said fifth and sixth registers, respectively, to the input of said first register, wherein said gates are controlled by the control signals from said microprogrammed control unit to effect a shift-right operation.

3. An electronic digit computer comprising:
a. first, second and third registers, each having an input and an output,
b. means connecting the output of the said first register to the input of said second register,
c. a first gate for coupling the output of said second register to the input of said first register,
d. means connecting the output of said second register to the input of said third register,
e. an adder having two inputs and an output,
f. second and third gates for coupling the outputs of said second and third registers, respectively, to the inputs of said adder,
g. a fourth gate for coupling the output of said adder to the input of said first register, and
h. a microprogrammed control unit for supplying appropriate control signals to said gates to effect the operations of circulation and transfer.

4. A computer as recited in claim 3, wherein said third register comprises fifth and sixth registers, said fifth register having a capacity equal to the number of bits corresponding to the digits of a decimal number, minus one digit, and said sixth register having a capacity equal to the number of bits corresponding to one decimal digit, means connecting the input of said fifth register as the input of said third register, means connecting the output of said sixth register as the output of said third register, means connecting the output of said fifth register to the input of said sixth register, and fifth and sixth gates for coupling the outputs of said fifth and sixth registers, respectively, to the input of said first register, said gates being controlled by the control signals from said microprogrammed control unit to effect a shift-right operation.

5. An electronic digital computer comprising:
a. first, second and third registers, each having an input and an output,
b. a plurality of gates being arranged to interconnect said first, second and third registers in various series paths by the application of suitable control signals thereto,
c. a microprogrammed control unit for supplying said control signals to said gates to effect the operations of circulation, shift and transfer, said microprogrammed control unit including a first matrix providing a plurality of step outputs, each step output denoting an interval time corresponding to one operation step, means providing a plurality of timing signals, each timing signal denoting a separate increment of time within each operation step, a second matrix for dividing each of said step outputs into a plurality of step signals, one step signal being provided for each timing interval, and a third matrix receiving said timing signals and said step signals and producing therefrom said control signals.

6. A computer as recited in claim 5, further comprising a source of electricity, and circuit means operable in response to said timing signals to connect said step signals to said source.

7. A computer as recited in claim 6 further including a gating means connected between said circuit means and said source of electricity, means producing a calculation signal, means coupling said calculation signal to said gating means, so whereby said source is selectively connected to said circuit means to control the operation being performed by said computer.

8. A method for use in an electronic digital computer comprising a plurality of registers, each having an input and an output, a plurality of gates arranged for interconnecting said plurality of registers in various series paths, one of said plurality of registers being divided into first and second portions, said first portion thereof having a capacity equal to the number of bits corresponding to the digits of the decimal number, minus one digit, and said second portion having a capacity equal to the number of bits corresponding to one decimal digit, an indicating means, means connecting the output of said second portion to said indicating means, said method being useful for displaying only a desired word in said indicating means and comprising the steps of:
a. controlling said plurality of gates to replace, by circulation in successive time intervals, the contents of each of said plurality of registers with said word, and
b. thereafter circulating said word in a series path of said plurality of registers so that only that word is supplied to said indicating means through said second portion of said register.

9. A method for use with a digital computer including a plurality of registers, each having an input and output, a first plurality of gates arranged for interconnecting said registers in a series path, an indicating means, a fourth register having an input and output, and a capacity equal to the number of bits corresponding to one decimal digit, and means connecting its output to the indicating means, and a second plurality of gates for coupling the outputs of said registers individually to the input of said fourth register, said method being useful for displaying only a desired word in said indicating means, and comprising the steps of:

a. controlling said first plurality of gates so that said word is circulated through said registers in said series path in successive timing intervals, and b. sequentially opening said second plurality of gates so that only that one of said plurality of registers which contains said word at a given timing interval is connected to the input of said fourth register.

* * * * *

PO-1050
(5/69)

UNITED STATES PATENT OFFICE
CERTIFICATE OF CORRECTION

Patent No. 3,641,330 Dated February 8, 1972

Inventor(s) Isao Hatano; Kenichi Kitajima, and Katsumi Iwatani

It is certified that error appears in the above-identified patent and that said Letters Patent are hereby corrected as shown below:

The above-identified patent is shown to be assigned to "[73] Omron Tateisi Electronics Co., Kyo-Ku, Kysto, Japan" which should read -- Omron Tateisi Electronics Co., Ukyo-ku, Kyoto, Japan --.

Signed and sealed this 15th day of August 1972.

(SEAL)
Attest:

EDWARD M.FLETCHER,JR.
Attesting Officer

ROBERT GOTTSCHALK
Commissioner of Patents